United States Patent
Ichimura

(10) Patent No.: US 8,007,365 B2
(45) Date of Patent: Aug. 30, 2011

(54) VIDEO GAME PROCESSING DEVICE, VIDEO GAME PROCESSING METHOD AND VIDEO GAME PROCESSING PROGRAM

(75) Inventor: Ryutaro Ichimura, Tokyo (JP)

(73) Assignee: Kabushiki Kaisha Square ENIX, Tokyo (JP)

( * ) Notice: Subject to any disclaimer, the term of this patent is extended or adjusted under 35 U.S.C. 154(b) by 343 days.

(21) Appl. No.: 12/468,145

(22) Filed: May 19, 2009

(65) Prior Publication Data

US 2009/0325707 A1 Dec. 31, 2009

(30) Foreign Application Priority Data

Jun. 29, 2008 (JP) .................................. 2008-169711

(51) Int. Cl.
*A63F 13/12* (2006.01)
(52) U.S. Cl. ................. 463/42; 463/23; 463/40; 463/43
(58) Field of Classification Search .................... 463/15, 463/23, 30, 40, 42, 43
See application file for complete search history.

(56) References Cited

U.S. PATENT DOCUMENTS

| | | | | |
|---|---|---|---|---|
| 6,123,619 A * | 9/2000 | Tokita et al. | .................... | 463/43 |
| 6,371,856 B1 * | 4/2002 | Niwa | ............................... | 463/43 |
| 6,676,519 B2 * | 1/2004 | Nakazawa | ...................... | 463/31 |
| 7,575,518 B2 * | 8/2009 | Tabata | ............................. | 463/40 |
| 7,637,806 B2 * | 12/2009 | Rhyne et al. | ...................... | 463/9 |
| 7,670,225 B2 * | 3/2010 | Nishimura | ...................... | 463/30 |
| 7,789,758 B2 * | 9/2010 | Wright | ............................ | 463/42 |

| | | | |
|---|---|---|---|
| 2007/0265046 A1 | 11/2007 | Sato | |
| 2007/0265047 A1 | 11/2007 | Nomura | |
| 2008/0139310 A1 | 6/2008 | Kando et al. | |

FOREIGN PATENT DOCUMENTS

| | | |
|---|---|---|
| JP | 2001-129260 | 5/2001 |
| JP | 2002-253866 | 9/2002 |
| JP | 2003-150820 | 5/2003 |
| JP | 2003-290558 | 10/2003 |

OTHER PUBLICATIONS

English language Abstract of JP 2003-150820, May 23, 2003.
Japan Office Action in JP Pat. Appl. No. 2008-169711, dated Nov. 24, 2010, along with an english translation thereof.

* cited by examiner

*Primary Examiner* — Dmitry Suhol
*Assistant Examiner* — Jay Trent Liddle
(74) *Attorney, Agent, or Firm* — Greenblum & Bernstein, P.L.C.

(57) ABSTRACT

A video game processing device for controlling progress of a video game includes a storage unit for storing a map-related data including a map information indicating a predetermined area and a status information of a non-player character, a communication establishing unit for establishing communication connection for carrying out data communication with another video game processing device, a map acquisition requirement receiving unit for receiving a map acquisition requirement of the map-related data by an operation of a player, an acquisition requirement informing unit for informing the other video game processing device of the acquisition requirement received in an occasion when the communication connection with the other video game processing device is established, a map-related data acquisition unit for acquiring the map-related data provided by the other video game processing device, and a map-related data renewal unit for renewing content stored in the map-related data storage unit.

10 Claims, 8 Drawing Sheets

Fig. 3

Map-related data

| Map-data | Boss character data | Level data | Discoverer data | Renewer data |
|---|---|---|---|---|
| MAP1 | Boss character1 | LV10 | UserA | UserA |
| MAP2 | Boss character2 | LV3 | UserA | UserB |
| MAP3 | Boss character3 | LV8 | UserC | UserA |
| MAP4 | Unacguisition | | | |
| MAP5 | Boss character5 | LV15 | UserD | UserE |

Fig. 7

| MAP4 | Boss character 4 | LV8 | UserB | UserB |

Fig. 8

| MAP1 | Boss character 1 | LV15 | UserC | UserB |

VIDEO GAME PROCESSING DEVICE, VIDEO GAME PROCESSING METHOD AND VIDEO GAME PROCESSING PROGRAM

FIELD OF THE INVENTION

The present invention relates to a technology for controlling progress of a video game, and more particularly, to a technology for obtaining data such as item used for a video game from another video game processing device, or exchanging the data of the present video game processing device with data of another video game processing device.

DESCRIPTION OF THE RELATED ART

In conventional technology in this field, there has been provided a various kinds of video games called "RPG" (Roll Playing Game, which is a game in which a player acts parts of characters in a world of the game, grows through various experiences with pleasure, and during the growth, the player achieves predetermined aims).

In such RPG, in general, a player character, who acts in response to operations of a player, gains or acquires various benefits such as experience values, items and the like through winning of the player character in battle against an enemy character obstructing achievement of the predetermined aims.

Some video game processing devices executing such video game as mentioned above includes one having a function of exchanging items obtained during the execution of the game with those of another video game processing device. Ordinarily, such items are handled as parameters of the player character operated by the player (for example, refer to Patent Publication 1: Japanese Patent Application Laid-open Publication No. 2003-150820).

In recent years, in order to increase pleasure in game, it is desired to transfer/receive an enemy character and data associated therewith playing in a video game between video game processing devices.

However, in a case where the enemy character and the data associated therewith as parameter of the player character are transferred/received in a conventional manner, there is a fear of generating several inconveniences on the video game. This is based on an occasion such that an environment of the game and the parameter thereof other than the player character change in accordance with the transferring/receiving of the enemy character and the data associated therewith.

If the environment of the game and the parameter thereof other than the player character change before or after the transferring/receiving of the enemy character and the date associated therewith, the changing will give an influence to progress of the game of the player on the video game.

As mentioned above, it has been considered to be difficult to realize the transferring/receiving of non-player character (NPC: character controlled in accordance with a control program by a video game processing device regardless of operation of a player) and data associated therewith from a viewpoint of maintaining confrontment or consistency of game progressing condition of the player.

SUMMARY OF THE INVENTION

The present invention was therefore conceived in consideration of the circumstances encountered in the prior art mentioned above and an object thereof is to provide a video game processing device, a video game processing method and a video game processing program capable of transferring or receiving a non-player character and data associated therewith while maintaining the consistency of the progressing condition of the player's game.

The above and other objects can be achieved according to the present invention by providing, in one aspect, a video game processing device for controlling progress of a video game, comprising:

a storage unit configured to store a map-related data including a map information indicating a predetermined area and a status information of a non-player character;

a communication establishing unit configured to establish communication connection for carrying out data communication with another video game processing device;

a map acquisition requirement receiving unit configured to receive an acquisition requirement of the map-related data by an operation of a player;

an acquisition requirement informing unit configured to inform the other video game processing device of the acquisition requirement received by the map acquisition requirement receiving unit in an occasion when the communication connection with the other video game processing device is established by the communication establishing unit;

a map-related data acquisition unit configured to acquire the map-related data provided by the other video game processing device according to the acquisition requirement; and a map-related renewal unit configured to store the map-related data acquired by the map-related data acquisition unit and then renew content stored in the map-related data storage unit.

In a preferred embodiment, the video game processing device may further include a map-related data providing unit configured to provide the map-related data to the other video game processing device in accordance with the acquisition requirement from the other video game processing device at a time when the communication connection with the other video game processing device is established by the communication establishing unit.

It may be desired that the status information of the non-player character included in the map-related data includes a level value indicating a level of the non-player character, and the video game processing device may further include an area clear processing unit configured to give, to the non-player character, a specific benefit such as an item not influencing the status of an area other than the corresponding predetermined area at every time when the non-player character becomes a battle-impossible condition by attacking of the player character operated by the player, and to renew the map-related data by increasing the level value indicating the level of the non-player character.

It may be desired that the predetermined area is an independent area which does not influence the status of the other area in the plural areas set to the video game.

In another aspect of the present invention, there is also provided a video game processing method for controlling a progress of a video game using a video game processing device, comprising the steps of:

establishing a communication connection for performing data communication with another video game processing device;

receiving a map acquisition requirement of the map-related data through an operation of a player;

informing the other video game progressing device of the acquisition requirement received by the map acquisition requirement at a time when the communication connection with the other video game progressing device is established in the communication establishing step;

acquiring the map-related data provided from the other video game processing device in accordance with the acquisition requirement; and storing the map-related data acquired in the map-related data acquiring step in a map-related data storing unit in which the map-related data including the map information showing the predetermined area and the status information of the non-player character appearing in the predetermined area is stored, and renewing a content stored in the map-related date storage unit.

In a further aspect of the present invention, there is also provided a video game processing program for controlling progress of a video game causing a computer to execute:

establishing a communication connection for performing data communication with another video game processing device;

receiving a map acquisition requirement of the map-related data through an operation of a player;

informing the other video game progressing device of the acquisition requirement received by the map acquisition requirement at a time when the communication connection with the other video game progressing device is established in the communication establishing step;

acquiring the map-related data provided from the other video game processing device in accordance with the acquisition requirement; and storing the map-related data acquired in the map-related data acquiring step in a map-related data storing unit in which the map-related data including the map information showing the predetermined area and the status information of the non-player character appearing in the predetermined area is stored, and renewing a content stored in the map-related date storage unit.

According to the present invention of the aspects mentioned above, the non-player character and the data related thereto can be received while maintaining the consistency of the progress of the game of the player.

The nature and further characteristic features of the present invention will be made clearer from the following descriptions made with reference to the accompanying drawings.

BRIEF DESCRIPTION OF THE DRAWINGS

In the accompanying drawings:

FIG. 3 is a view showing data related to a map (hereinafter called "map-related data") stored in the terminal of the user.

FIG. 7 is a view showing one example of map-related data received by the terminal of the user;

FIG. 8 is a view showing another example of map-related data received by the terminal of the user.

DESCRIPTION OF THE PREFERRED EMBODIMENT

Hereunder, a preferred embodiment of the present invention will be described with reference to the accompanying drawings.

Figure 1:
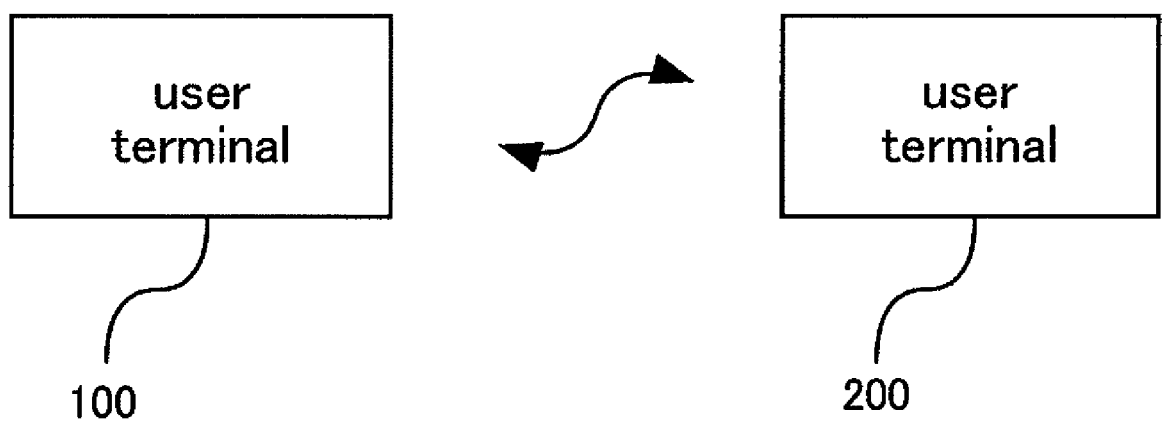
FIG. 1 is a view showing a network relationship between a terminal of one user and a terminal of another user according to one embodiment of the present invention.

FIG. 1 is an illustrated block diagram showing a terminal 100 of a user representing one embodiment of a video game processing device according to the present invention and another terminal 200 of a user of another video game processing device having the same construction as that of the terminal 100.

The terminal 100 is managed by a user A, and a video game progresses in response to an operation by the user A. In the like manner, the terminal B is managed by the user B, and a video game progresses in response to an operation by the user B. The respective terminals 100 and 200 have functions for performing wireless communication, and as such user's terminals 100 and 200, various kinds of information processing devices such as portable game devices, installed-type game devices, computer devices, cellular phones and the like may be applied.

Figure 2:
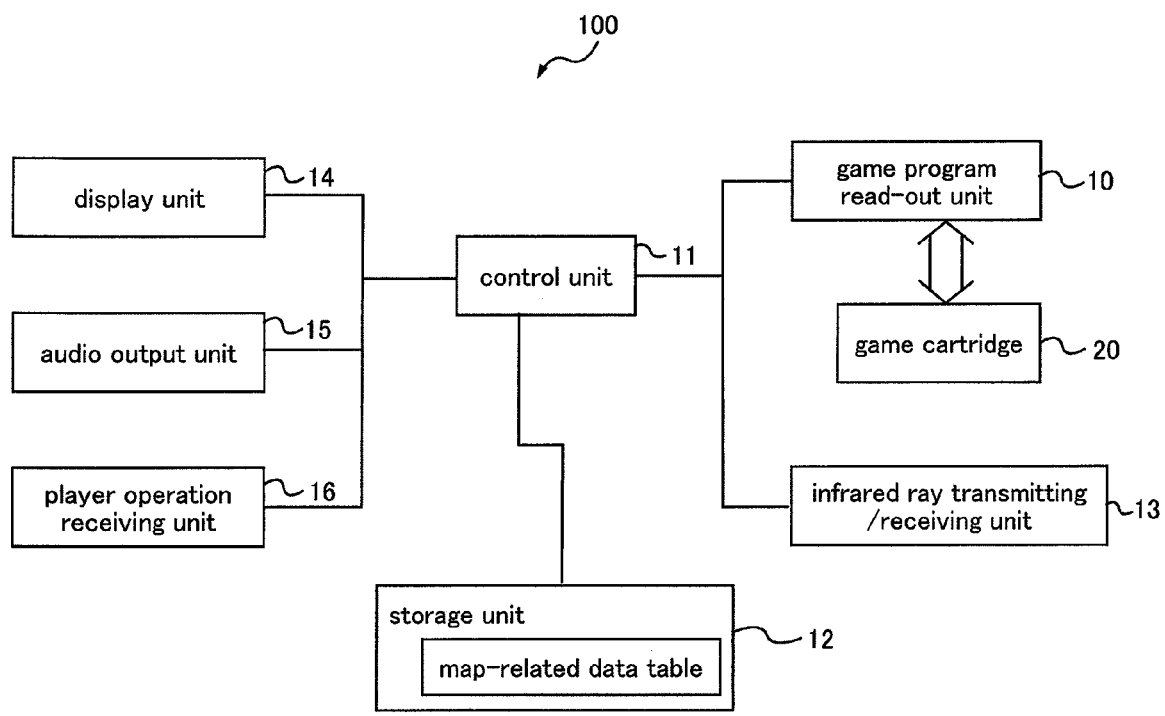
FIG. 2 is a block diagram showing one example of a construction of the terminal of the user.

With reference to FIG. 2 showing a block diagram of a construction of the user's terminal 100, the terminal 100 includes a game program read-out unit 10, a control unit 11, a storage unit 12, an infrared ray receiving unit 13, a display unit 14, a voice output unit 15 and a player operation receiving unit 16. The terminal 200 has the same construction as that of the terminal 100.

The game program read-out unit 10 is detachably incorporated with a game cartridge 20 containing a memory (storage) medium accommodating a game program, and serves to read out a necessary game program from the memory medium of the game cartridge 20. Further, in this embodiment, a video game program classified into RPG is stored in the memory medium contained in the game cartridge 20.

The control unit 11 serves to execute the game program read out by the game program read-out unit 10 and to progress the video game in response to the operation of a player. In this embodiment, the user A is the player.

The storage unit 12 includes a memory medium for storing game program and data necessary for progressing the video game, and is composed of a non-volatile memory such as RAM. Data related to map is stored in the storage unit 12 in accordance with the progress of the game and through the communication with the other terminal 200. The map-related data will be described hereinafter.

The infrared ray receiving unit 13 serves to transmit or receive infrared ray for the communication with the user's terminal 200. The display unit 14 is a displayer for displaying a game screen in response to the progress of the game or the operation of the player under the control of the control unit 11, and the display unit 14 is, for example, composed of a liquid crystal device.

The voice output unit 15 outputs voice in response to the game progress or player's operation under the control of the control unit 11. The player operation receiving unit 16 includes a plurality of buttons, receives the operation of the user A and informs the control unit 11 of a result of the operation.

In the user's terminal A of this embodiment, a system for reading out the game program from the game cartridge 20 is adopted. However, a construction for downloading the game program by using wire or without using the wire may be also adopted.

Here, map-related data stored in the storage unit 12 will be explained with reference to FIG. 3. As shown in FIG. 3, a data table related to the map is stored with a plurality of map-related data corresponding to respective independent areas not influencing status of another area in a plurality of areas set in the video game. The map-related data includes map data representing corresponding map, boss character data, discoverer data and renewer data (update person data).

The map data contained in the map-related data is a map which is used in either one of plural areas set in a virtual space, for example, prescribed by the RPG that is a video game. These plural areas denote specific areas (places) in which the player character is hidden in an area movable according to the progressing of the video game. In such specific area, an environment capable of controlling the player character in the specific area only in a case where such an item as "jewel's map" is obtained by the player character. In this embodiment, it is assumed that plural kinds of "jewel's map" (five, for example) are provided. In the game area corresponding to the "jewel's map", an item corresponding to the jewel is obtainable by knocking out a boss character appearing in that area.

A boss character data is data representing a boss character appearing as a boss in a corresponding map in an enemy character obstructing action of the player character. This boss character could be set a boss character specific to the area of the corresponding map. In addition, plural kinds of boss characters may be set with respect to the respective areas.

The level data presents a level of this boss character. This boss character level means strength of the boss character in the battle to the player character. The level of the boss character is increased up every time when the boss character is knocked down (i.e., becomes battle-impossible condition) by the player character. That is, in an event where the player character again meets the boss character after the boss character has been knocked down by the player character operated by a player, the level of the boss character is increased than that in the case where the player met the boss character before. Thus, such an environment that the player character meets a leveled-up boss character every time when the boss character is knocked down (every time when an event in the corresponding map is cleared) is provided to the player character.

The discoverer data represents a player name set to a player character who found out a specific area. The discoverer data is a player name set to a player character who obtained the "jewel's map", for example.

The renewer data represents a player name set to a player character who knocked down the boss character having the highest level in the boss characters who knocked down in the specific area shown with the map-related data (i.e., the player name who finally renewed the level of the boss character). That is, the renewer data represents the player name set to the player character knocking down the newest boss character in the specific area. As mentioned hereinafter, since the map-related data is transferred between different user terminals, the discoverer data may differ from the renewer data.

In the map-related data table shown in FIG. 3, five reservation areas are provided, in which the map-related data are stored in four areas. The control unit 11 serves to display an image in the specific area on the display unit 14 based on either one of the four map-related data. Beforehand the displaying, an explanation screen of the specific area (i.e., map showing abstract of the specific area) may be displayed. One example of this explanation screen will be shown in FIG. 4.

Figure 4:
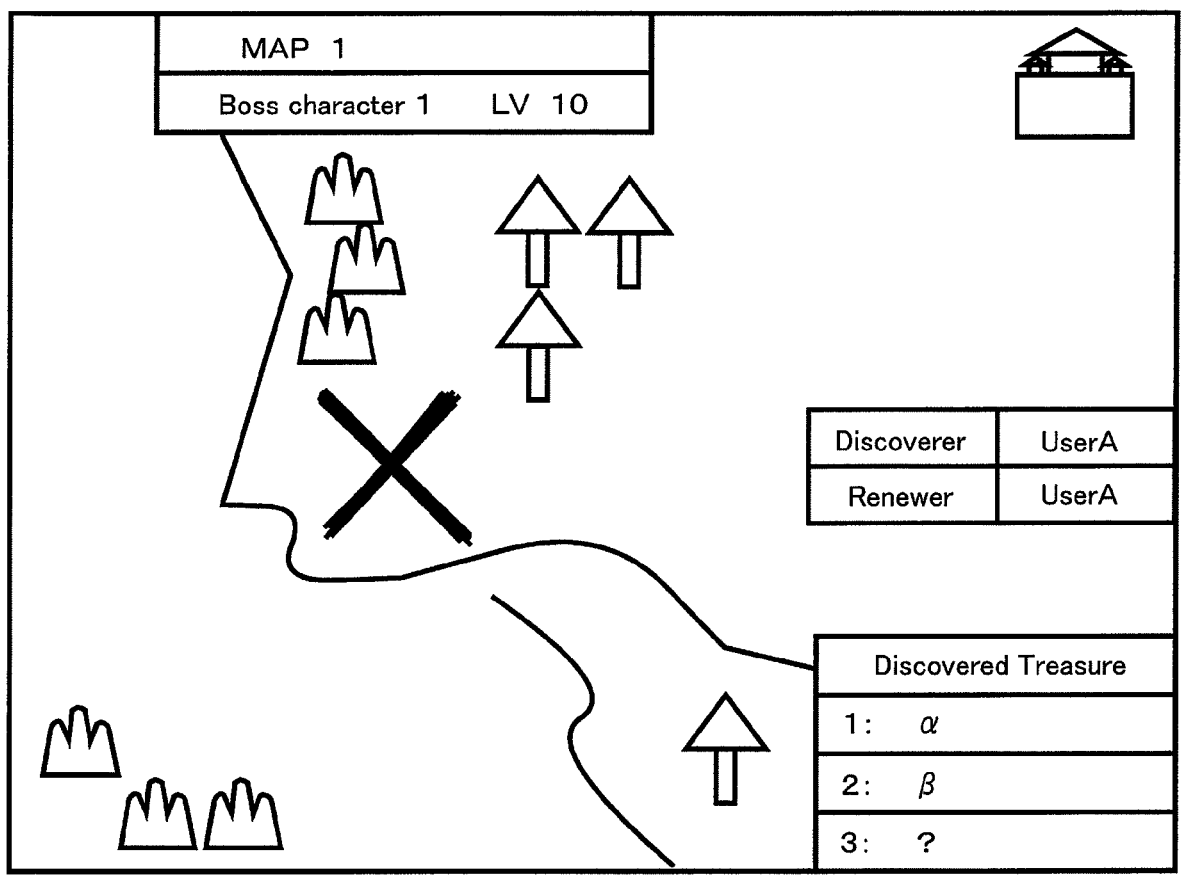
FIG. 4 is a view showing one example of a screen display on a display unit of the terminal of the user.

FIG. 4 is an explanation screen of the specific area based on the map-related data of the map data MP1 registered in the most high lank of the map-related data. As shown in FIG. 4, in this explanation screen, there are provided, for example, a display area displaying a map showing abstract of the specific area, a display area displaying a name of the corresponding map data, a display area displaying the name and level of the boss character, a display area showing a discoverer, a display area showing a renewer, and a display area showing a name of a discovered jewel.

Further, although the map-related data in this embodiment includes the boss character data, in a case where a single specific boss character is set with respect to the map, the boss character data may be removed from the map-related data. In such case, the control unit 11 obtains the boss character data corresponding to the map-related data from the video game program of the game cartridge 20.

Next, operation of the user terminal of the present embodiment will be described hereunder.

Figure 5:
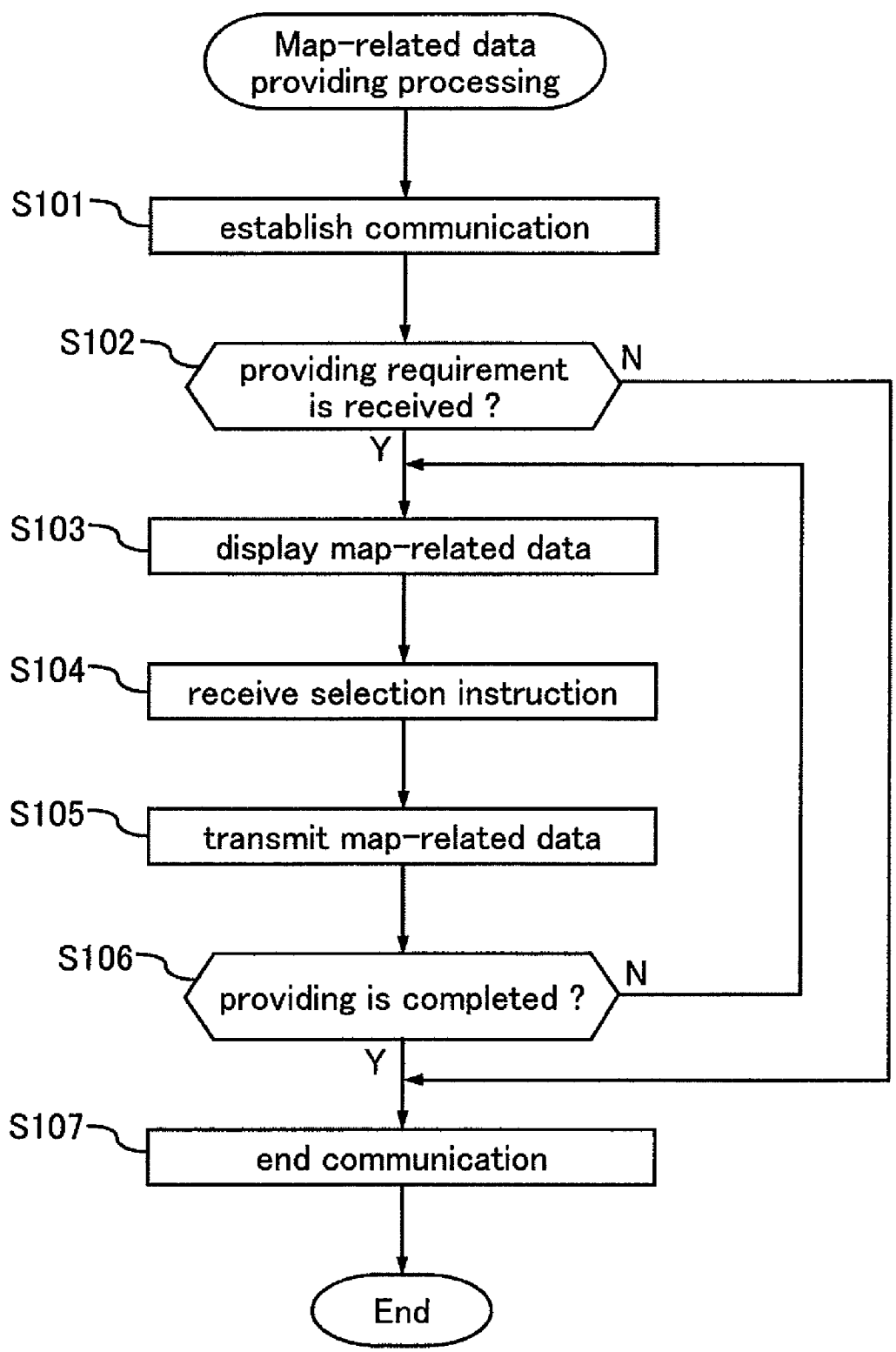
FIG. 5 is a flowchart representing one example of providing map-related data.

FIG. 5 is a flowchart representing one example of a process of providing a map-related data, and herein, there will be explained a case in which the map-related data is provided from the user terminal 100 to the user terminal 200 in accordance with the operation of the user A.

In the process of providing the map-related data, the control unit 11 serves to establish communication to another user terminal through the infrared ray transmitting/receiving unit 13 in a case where the operation of the user A received by the player operation receiving unit 16 represents the indication of providing the map-related data. For example, the operation received by the player operation receiving unit 16 shows the provision of the map-related data to the user terminal 200, the control unit 11 controls the infrared ray transmitting/receiving unit 13 so as to establish the communication with the user terminal 200. For such establishment of the communication, a known technology may be applied.

In the next step, the control unit 11 judges whether providing request of the map-related data (map-related data providing request) is normally received or not from the user terminal 200 through the infrared ray transmitting/receiving unit 13 (step S102). In the case where the providing request is not normally received within a predetermined time, the communication with the user terminal 200 is ended, and then, the process for providing the map-related data is ended (step S107).

When the control unit 11 receives the map-related data providing request from the user terminal 200 ("Y" in step S102), the control unit 11 serves to display the map-related data stored in the storage unit 12 on the display unit 14 (step S103). For example, as shown in FIG. 3, in the case where the four map-related data are stored in the storage unit 12, these four map-related data are displayed on the display unit 14.

The user A can select the map-related data to be provided for the user B operating the user terminal 200. The control unit 11 receives selection instructions of the user A by way of the player operation receiving unit 16 (step S104).

The control unit 11 then serves to concert the same data as the selected map-related data into data format adapted for data transmission, and transmit the data to the user terminal 200 through the infrared ray transmitting/receiving unit 13 (step S105).

Upon the completion of the transmittance, the control unit 11 inquires the user A whether the map-related data providing is to be finished or not (step S106). This may be realized by displaying a message such as "is the map-related data providing to be finished?" on the display unit 14.

When the control unit 11 receives the instructions of the finishing of the map-related data providing through the player operation receiving unit 16 ("Y" in the step S106), the communication with the user terminal 200 is finished and the process of providing the map-related data is ended (step S107).

On the other hand, when the control unit 11 receives the instructions that the map-related data providing has not been finished through the player operation receiving unit 16 ("N" in the step S106), the step returns to the step S103 for continuing the map-related data providing, and the control unit 11 performs the process of displaying the map-related data.

In accordance with the processes mentioned above, the desired map-related data from the map-related data stored in the storage unit 12 of the user terminal 100 is provided to the user terminal 200. As a result, in the user terminal 200, a new boss character based on the received map-related data is provided to the user B. In this occasion, the level of this boss character is treated as parameter of the specific area, so that the consistency of the game progressing condition of the player can be maintained.

Figure 6:
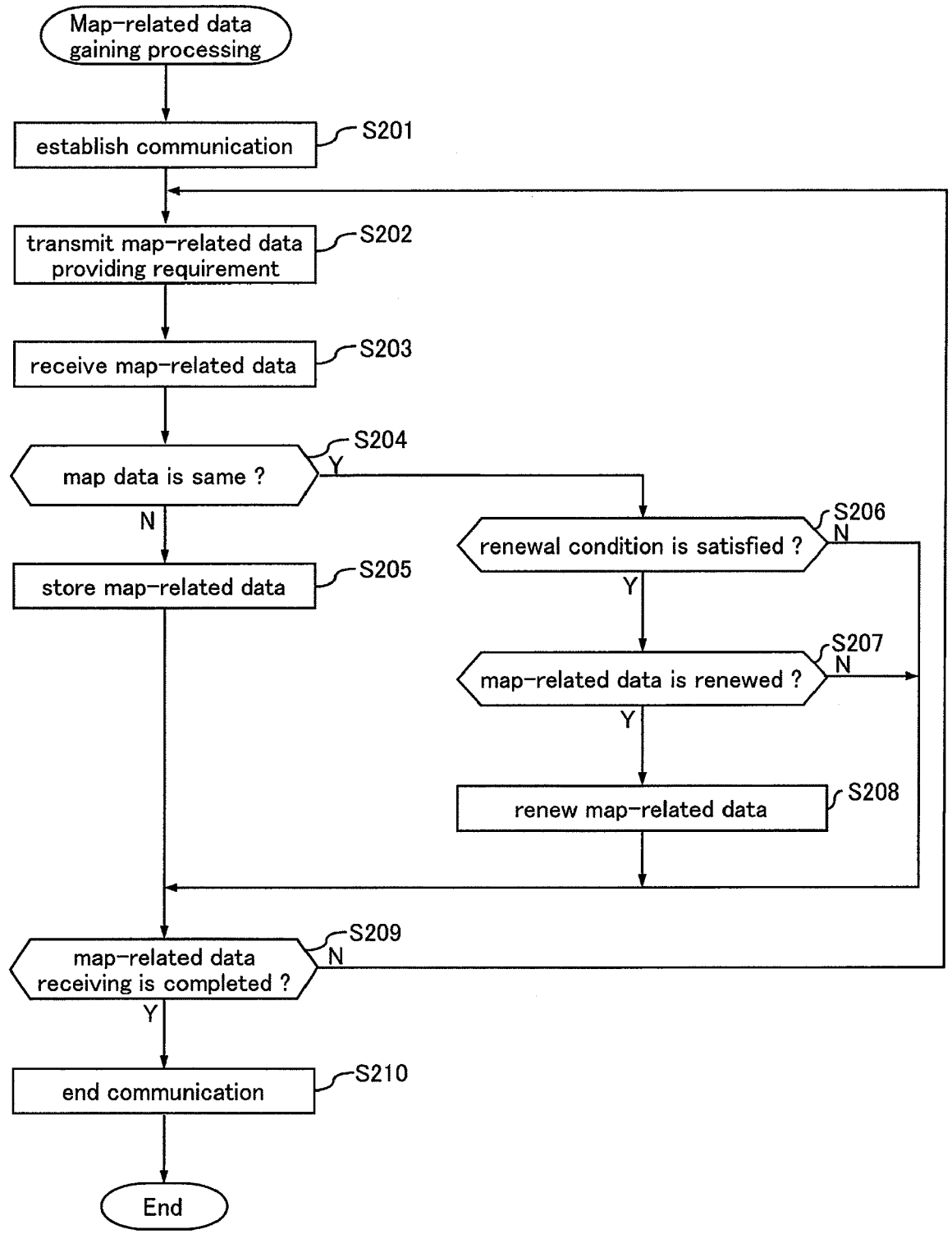
FIG. 6 is a flowchart representing one example of the map-related data acquisition processing.

FIG. 6 is a flowchart representing one example of a process of obtaining the map-related data executed by the user terminal 200. This flowchart explains an example in which the user terminal 100 obtains the map-related data from the user terminal 200 by the operation of the user A.

That is, in the process of obtaining the map-related data, if the operation of the user A received by the player operation receiving unit 16 indicates instructions of obtaining the map-related data (including, for example, the designation of the map), the communication with the other user terminal through the infrared ray transmitting/receiving unit 13 is established (step S201).

In the next step, the control unit 11 transmits the map-related data providing request to the user terminal 200 through the infrared ray transmitting/receiving unit 13, in order to require the obtaining of the map-related data (step S202). The control unit 11 receives the map-related data transmitted, in the data format for transmission, from the user terminal 200 in response to the map-related data providing request (step S203).

The control unit 11 decode the received map-related data, and judges whether or not the map-related data having the same map as the map-related data contained in the received map-related data had already been stored in the storage unit 12 (step S204).

In a case where the map data of the received map-related data differs from map data of all the map-related data stored in the storage unit 12 ("N" in the step S204), the control unit 11 serves to newly store the received map-related data (step S205). For example, in a case where the received map-related data is map-related data shown in FIG. 7, the map data of the received map-related data is MAP2. The map-related data of the MAP2 does not exist in the map-related data table shown in FIG. 3. Accordingly, the control unit 11 newly stores the received map-related data in the storage unit 12.

In a case where the map of the received map-related data accords with either one of the map data of the map-related data stored in the storage unit 12 ("Y" in the step S204), the control unit 11 compares the boss character data and the level data of the received map-related data with the boss character data and the level data of the same map-related data stored in the storage unit 12 and judges whether it satisfies the renewal condition (step S206). Herein, in a case where the boss character data differs or the level data stored in the storage unit 12 is lower than the level data of the received map-related data, the control unit 11 judges that the renewal condition is satisfied ("Y" in the step S206).

In the next step, the control unit 11 inquires to the user A whether the map-related data stored in the storage unit 12 should be renewed with the received map-related data. In a case where the control unit 11 receives instructions for accepting the renewal data through the player operation receiving unit 16 ("Y" in the step S207), the control unit 11 rewrites the map-related data stored in the storage unit 12 to the received map-related data (step S208).

Herein, there will explain a case where the map-related data shown in FIG. 8 is received.

In this case, the map data of the received map-related data is MAP1. On the other hand, the map-related data of the MAP1 is stored in the storage unit 12. Accordingly, the control unit 11 performs the processing of judging whether the renewal condition in the step S206 is satisfied or not. The boss character data of the map-related data of the MAP1, which had already been stored, is the same as the boss character data of the received map-related data. Furthermore, the level data of the map-related data of the MAP1, which had already been stored, is LV 10, and the level data of the received map-related data is LV 15.

Therefore, the control unit 11 judges that the renewal condition has been satisfied, and renews the map-related data of the already stored MAP1 to the received map-related data. More specifically, the level data of the map-related data of the MAP1 is renewed from LV10 to LV 15, the discoverer data is changed from the user A to the user C, and the renewer data is changed from the user A to the user B. Further, it is not necessary to absolutely change the discoverer data.

The control unit 11 inquires to the user A whether the reception of the map-related data should be ended or not to the user A (step S209) upon the completion of the storage or renewal of the map-related data in the storage unit 12 (step S205 or step S208). This may be realized by displaying message such as "whether the reception of the map-related data is to be ended or not" on the display unit 14.

Upon the reception of the instructions of finishing the map-related data reception through the player operation receiving unit 16 ("Y" in the step S209), the control unit 11 finishes the communication with the user terminal 200 and ends the process of receiving the map-related data (step S210).

If the control unit 11 receives that the reception of the map-related data has not been completed through the player operation receiving unit 16 ("N" in the step S209), the process returns to the step S202 for continuing the providing of the map-related data, and the control unit 11 operates to transmit the map-related data providing request to the user terminal 200. In a case where the renewal condition is not satisfied ("N" in the step S206) or where instructions that the renewal is not admitted through the player operation receiving unit 16 is received ("N" in the step S207), the processing of the step S209 is executed.

According to the processes of the steps mentioned above, in the user terminal 100, new map-related data from the user terminal 200 is received and stored in the storage unit 12, or the map-related data stored in the storage unit 12 is renewed. As a result, in the user terminal 100, a new boss character based on the new map-related data is provided to the user A. In such stage, the level of this boss character is treated as parameter of the specific area, so that the consistency of the game advancing condition of the player can be maintained.

Figure 9:
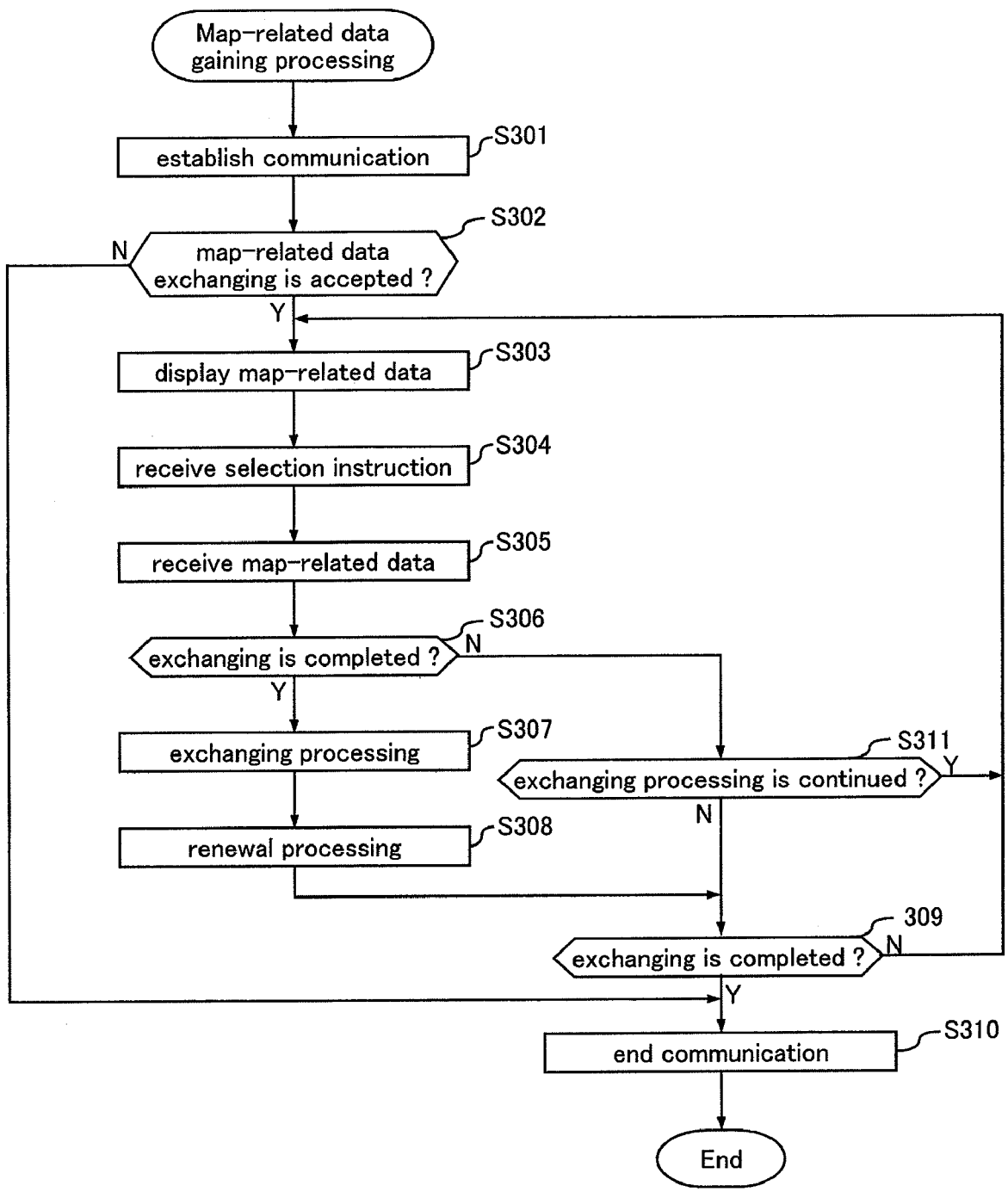
FIG. 9 is a flowchart representing one example of exchanging map-related data.

FIG. 9 is a flowchart representing an example of map-related data exchanging processing executed by the user terminal 100. In this example, there is explained a case in which the map-related date is exchanged between the user terminal 100 and the user terminal 200.

In this map-related data exchanging processing, in a case where the operation of the user A received by the player operation receiving unit 16 indicates the exchange of the map-related data, the user terminal 100 establishes the communication with the user terminal 200 through the infrared ray transmitting/receiving unit 13 (step S301).

In the next step, the control unit 11 judges whether the map-related data exchanging processing is accepted or not in the user terminal 200 (step S302). This judging will be realized by, for example, transmitting the map-related data exchanging request to the user terminal 200 through the infrared ray transmitting/receiving unit 13 and judging whether a response signal accepting this request is transmitted from the user terminal 200 and received within a predetermined time or not.

In a case where the map-related data exchanging processing has not been accepted in the user terminal 200, ("N" in the step S302), the communication with the user terminal 200 is ended and the map-related data exchanging processing is also ended (step S310).

On the other hand, in a case where the map-related data exchanging processing is accepted in the user terminal 200 ("Y" in the step S302), the map-related date table stored in the storage unit 12 is displayed on the display unit 14 (step S303).

For example, in the case, as shown in FIG. 3, where the four map-related data are stored in the storage unit 12, these four map-related data are displayed on the display unit 14. In this case, the user A can select the map-related data, which is exchangeable from the user B operating the user terminal 200, in these map-related data displayed on the display unit 14. The control unit 11 receives the instructions of this selection of the user A through the player operation receiving unit 16 (step S304).

Next, the control unit 11 receives the map-related data which is an object to be exchanged from the user terminal 200 through the infrared ray transmitting/receiving unit 13, and displays the received map-related data on the display unit 14 (step S305).

The player operation receiving unit 16 receives an operation as to whether the exchanging between the map-related data selected in the step S304 and the map-related data for the exchanging received from the user terminal 200 is to be accepted or not (step S306).

In the next step, if the control unit 11 is received with the operation indicating the acceptance of the exchanging through the player operation receiving unit 16 ("Y" in step S306), the exchanging of the map-related data is executed using the infrared ray transmitting/receiving unit 13 (step S307). The control unit 11 executes the renewal processing to the accepted exchanging data (step S308). Since the processing in the steps S204-S208 explained with reference to FIG. 6 is applicable to this renewal processing, the details thereof will be omitted herein.

Thereafter, the control unit 11 performs processing for questioning to the user A whether the exchanging processing should be ended or not (step S309). When the player operation receiving unit 16 receives the instructions for ending the exchanging processing from the user A ("Y" in the step S309), the control unit 11 ends the communication with the user terminal 200 to thereby end (complete) the processing for exchanging the map-related data (step S310).

In this operation, if the player operation receiving unit 16 receives that the exchanging with the map-related data received from the user terminal 200 is not acceptable (step S306), or if the player operation receiving unit 16 receives that the exchanging processing should not be ended from the user A ("N" in the step S309), the control unit 11 executes processing for questioning to the user A whether the map-related data exchanging processing should be continued or not (step S311).

In a case where the player operation receiving unit 16 receives an operation that the map-related date exchanging processing should not be continued ("N" in the step S311), the control unit 11 ends the communication with the user terminal 200 and ends the processing for exchanging the map-related data.

On the other hand, in a case where the player operation receiving unit 16 receives an operation that the map-related data exchanging processing should be continued ("Y" in the step S311), the control unit 11 returns to the processing in the step S302.

In accordance with the operations mentioned above, the exchanging of the map-related data between the user terminal 100 and the user terminal 200 is executed. In the user terminal 100, a new boss character is provided to the user A based on a new map-related data. In this operation, since the level of this boss character is dealt with as parameter of the specific area, the consistency of the game progressing condition of the player may be maintained.

Likely, in the user terminal 200, a new boss character is provided to the user B based on a new map-related data. In this operation, since the level of this boss character is dealt with as parameter of the specific area, the consistency of the game progressing condition of the player may be maintained.

As mentioned above, only the data of the boss character is not separated from map information (map data) and exchanged, the map-related data, in which the map information and the boss character data are handled as one set, is transmitted and received between the user terminal 100 and the user terminal 200, so that the consistency in the game progressing condition can be maintained.

That is, even in a case where the level data of the boss character and the map condition shown by the map data (for example, presence or absence of a wall of a cave which is to be destroyed in order to induce the boss character) are associated with each other, the consistency in the game progressing condition may be maintained. More specifically, in a case where, for example, a user who has not yet destroyed a wall clogging an entrance of the cave receives from another user only the data of the boss character appearing within a field shown by the map in a condition separated from the corresponding map data, the boss character appears outward through the wall which has not been destroyed, and the consistency of the game progressing condition has lost and a setting on the game is damaged.

On the other hand, in a case where, for example, a user who has not yet destroyed a wall clogging an entrance of the cave receives from another user a map-related data in which the map data of the corresponding map and the boss character data are made as a set, the map information together with the boss character data is renewed, and since the wall closing the entrance of the cave in a destroyed condition, it becomes possible not to damage the setting on the game without losing the consistency in the game progressing condition.

Further, in the example mentioned above, the data (level data and like) of the boss character as enemy character blocking the action of the player character is included in the map-related data, and the enemy character data is transmitted and received together with the map data. However, the data which is transmitted and received together with the map data may be character data other than the player character data and may be non-player data including a neutral character as well as the enemy character.

As mentioned above, in the described embodiment, the video game processing device (user terminal 100) controlling the progressing of the video game includes a storage unit 12 storing the map-related data including the map information showing a predetermined area (map data) and the status information (level data) of the non-player character appearing within the predetermined area, and the video game processing device has a function for establishing the communication connection for carrying out the data communication with the other video game processing device (with user terminal 200), and when acquisition requirement of the map-related data by the operation of the player is received and the communication connection with the other video game processing device is established, the received acquisition requirement is announced to the other video game processing device, the map-related data provided by the other video game processing device in accordance with the acquisition requirement is obtainable, and the obtained map-related data is stored to thereby renew (update) the stored content in the storage unit 12. Accordingly, the non-player character data and the data associated therewith are obtainable while maintaining the consistency of the game progressing condition of the player.

In the above description, the term "predetermined area" means, as explained above, "independent area" which does not give any influence to the status of the other area in a plurality of areas set in the video game. Furthermore, the map-related data including the map information (map data) showing the "independent area" and the status information (level data) of the non-player character appearing in the predetermined area is transmitted and received, so that it becomes possible to transmit and receive the non-player character data and the data related thereto while maintaining the consistency of the game progressing condition of the player. Further, this "independent area" may include not only the "independent area", which is one area in the entire video game, completely independent from the other area, but also an area having a portion associated with the other area in a range not influencing the scenario or story of the video game.

As mentioned above, in the described embodiment, it is configured that the map-related data, which is the map-related data corresponding to the predetermined area not influencing the status of the other area, including the status information of the non-player character appearing in its independent area is obtained from the other video game processing device. Accordingly, it becomes possible to use, in the self video game processing device, the independent area (map showing the map data) corresponding to the map-related data obtained form the other video game processing device while maintaining the consistency of the game progressing condition, and to obtain the non-player character data and data associated therewith date from the other video game processing device.

Furthermore, in the embodiment described above, in an event that the communication of video game processing device (user terminal 100) with another video game processing device is established, the map-related data can be provided to the other video game processing device in accordance with the acquisition requirement from the other video game processing device. Accordingly, while maintaining the consistency of the progressing state of the player, the enemy character data and its associated data can be provided. Therefore, the non-player character and related data associated therewith can be received (exchanged) while maintaining the consistency of the game progressing state of the player.

Still furthermore, in the described embodiment, the status information of the non-player character included in the map-related data includes the level value showing the level of the non-player character, and every time the non-player character becomes the battle-impossible state by the attacking of the player character operated by the player, and the corresponding area is then cleared, the video game processing device (user terminal 100) executes the processing for giving the specific benefit such as item not influencing the status of the area other than the corresponding predetermined area to the player character, increasing the level value indicating the level of the non-player character and then renewing the map-related data. Accordingly, even with the same map data, it becomes possible to take various modes different in their level values of the non-player characters and to transfer/receive such map data between the video game processing devices.

As mentioned above according to the present invention, the enemy character and data related thereto can be received while maintaining the consistency of the progressing state of the game of the player, thus improving the interest in the games of the player and hence being effective.

It is further to be noted that the present invention is not limited to the described embodiments and many other changes and modifications may be made without departing from the scopes of the appended claims.

For example, in the descried embodiments, although the present invention was explained with reference to the example of the RPG, the present invention is applicable to video games other than the RPG.

In addition, although not described in the above, the video game processing devices (user terminals 100, 200) execute the respective progresses mentioned above in accordance with control program stored in storage devices or like units provided for themselves.

What is claimed is:

1. A video game processing device for controlling progress of a video game independently of an other video game processing device, comprising:
    a map-related data storage configured to store first map-related data including first map information indicating a first predetermined area and first status information of a first non-player character, the first status information of the first non-player character included in the first map-related data including a first level value indicating a first level of the first non-player character;
    a communication establisher configured to establish a communication connection for carrying out data communication with the other video game processing device;
    a map acquisition requirement receiver configured to receive a map acquisition requirement of second map-related data via an operation of a player;
    an acquisition requirement informer configured to inform the other video game processing device of the map acquisition requirement received by the map acquisition requirement receiver when the communication connection with the other video game processing device is established by the communication establisher;
    a map-related data acquirer configured to acquire the second map-related data provided by the other video game processing device according to the map acquisition requirement, the second map-related data including second map information that indicates a second predetermined area and second status information of a second non-player character, the second status information including a second level value indicating a second level of the second non-player character;
    a map-related data renewer configured to store the second map-related data acquired by the map-related data acquirer in the map-related data storage when the second map information included in the second map-related data is not stored in the map-related data storage; and
    an area clear processor configured to renew the first map-related data by increasing the first level value indicating the first level of the first non-player character each time that the first non-player character becomes a battle-impossible condition by an attack of a player character operated by the player, wherein, when the second map information included in the second map-related data is the same as the first map information included in the first map-related data that is stored in the map-related data storage, the map-related data renewer compares the second status information of the second map-related data with the first status information of the first map-related data, and, in response to renewal conditions being determined to be satisfied, performs a confirmation process to confirm advisability of renewal with the player, and, when a renewal instruction is received via the operation of the player, renews the content stored in the map-related data storage, the renewal conditions including whether the first level value in the first status information of the first map-related data stored in the map-related data storage is lower than the second level value in the second status information of the second map-related data acquired by the map-related data acquirer.

2. The video game processing device according to claim 1, further comprising a map-related data provider configured to provide the first map-related data to the other video game processing device in accordance with a second map acquisition requirement from the other video game processing device at a time when the communication connection with the other video game processing device is established by the communication establisher.

3. The video game processing device according to claim 2, wherein the area clear processor gives, to the first non-player character, a special benefit each time that the first non-player character becomes the battle-impossible condition by attack of the player character operated by the player.

4. The video game processing device according to claim 3, wherein the first predetermined area is an independent area which does not influence a status of an other area of plural areas set to the video game.

5. The video game processing device according to claim 2, wherein the first predetermined area is an independent area which does not influence a status of an other area of plural areas set to the video game.

6. The video game processing device according to claim 1, wherein the first predetermined area is an independent area which does not influence a status of an other area of plural areas set to the video game.

7. The video game processing device according to claim 1, wherein the area clear processor gives, to the first non-player character, a special benefit each time that the first non-player character becomes the battle-impossible condition by attack of the player character operated by the player.

8. The video game processing device according to claim 7, wherein the first predetermined area is an independent area which does not influence a status of an other area of plural areas set to the video game.

9. A video game processing method for controlling a progress of a video game using a video game processing device independently of an other video game processing device, comprising:

establishing a communication connection for performing data communication with the other video game processing device;

receiving a map acquisition requirement of second map-related data through an operation of a player;

informing the other video game progressing device of the map acquisition requirement when the communication connection with the other video game progressing device is established;

acquiring the second map-related data from the other video game processing device in accordance with the map acquisition requirement, the second main-related data including second map information that indicates a second predetermined area and second status information of a second non-player character, the second status information including a second level value indicating a second level of the second non-player character; and storing the second map-related data acquired from the other video game processing device in a map-related data storage, in which first map-related data including first map information showing a first predetermined area and first status information of a first non-player character appearing in the first predetermined area is stored, when the second map information included in the second map-related data is not stored in the map-related data storage, wherein the first status information of the first non-player character included in the first map-related data includes a first level value indicating a first level of the first non-player character, and the method further comprises:

renewing the first map-related data by increasing the first level value indicating the first level of the first non-player character each time that the first non-player character becomes a battle-impossible condition by attack of a player character operated by the player; and when the second map information included in the second map-related data is the same as the first map information included in the first map-related data that is stored in the map-related data storage, comparing the second status information of the second map-related data with the first status information of the first map-related data, and, in response to renewal conditions being determined to be satisfied, performing a confirmation process to confirm advisability of renewal with the player, and, when a renewal instruction is received through the operation of the player, renewing the content stored in the map-related data storage, the renewal conditions including whether the first level value in the first status information of the first map-related data stored in the map-related data storage is lower than the second level value in the second status information of the second map-related data.

10. A non-transitory computer-readable medium embodying a video game processing program for controlling progress of a video game using a video game processing device independently of an other video game processing device, the video game processing program causing a computer to execute:

establishing a communication connection for performing data communication with the other video game processing device;

receiving a map acquisition requirement of second map-related data through an operation of a player;

informing the other video game progressing device of the map acquisition requirement when the communication connection with the other video game progressing device is established;

acquiring the second map-related data from the other video game processing device in accordance with the map acquisition requirement, the second main-related data including second map information that indicates a second predetermined area and second status information of a second non-player character, the second status information including a second level value indicating a second level of the second non-player character; and storing the second map-related data acquired from the other video game processing device in a map-related data storage, in which first map-related data including first map information showing a first predetermined area and first status information of a first non-player character appearing in the first predetermined area is stored, when the second map information included in the second map-related data is not stored in the map-related data storage, wherein the first status information of the first non-player character included in the first map-related data includes a first level value indicating a first level of the first non-player character, and the program causes the computer to further execute:
renewing the first map-related data by increasing the first level value indicating the first level of the first non-player character each time that the first non-player character becomes a battle-impossible condition by attack of a player character operated by the player; and when the second map information included in the second map-related data is the same as the first map information included in the first map-related data that is stored in the map-related data storage, comparing the second status information of the second map-related data with the first status information of the first map-related data, and, in response to renewal conditions being determined to be satisfied, performing a confirmation process to confirm advisability of renewal with the player, and, when a renewal instruction is received through the operation of the player, renewing the content stored in the map-related data storage, the renewal conditions including whether the first level value in the first status information of the first map-related data stored in the map-related data storage is lower than the second level value in the second status information of the second map-related data.

* * * * *

UNITED STATES PATENT AND TRADEMARK OFFICE
CERTIFICATE OF CORRECTION

| | | |
|---|---|---|
| PATENT NO. | : 8,007,365 B2 | Page 1 of 1 |
| APPLICATION NO. | : 12/468145 | |
| DATED | : August 30, 2011 | |
| INVENTOR(S) | : R. Ichimura | |

It is certified that error appears in the above-identified patent and that said Letters Patent is hereby corrected as shown below:

At column 14, line 7 (claim 9, line 16), "main-related" should be -- map-related -- after second.

At column 15, line 1 (claim 10, line 18), "main-related" should be -- map-related -- after second.

Signed and Sealed this
Twenty-second Day of November, 2011

David J. Kappos
*Director of the United States Patent and Trademark Office*